US012491694B2

(12) United States Patent
Kempka, Jr.

(10) Patent No.: US 12,491,694 B2
(45) Date of Patent: Dec. 9, 2025

(54) PRESSER ASSEMBLY WITH MAGNETIC BIASING

(71) Applicant: Blanking Systems, Inc., Grafton, WI (US)

(72) Inventor: Russell A. Kempka, Jr., Grafton, WI (US)

(73) Assignee: Blanking Systems, Inc., Grafton, WI (US)

( * ) Notice: Subject to any disclaimer, the term of this patent is extended or adjusted under 35 U.S.C. 154(b) by 0 days.

(21) Appl. No.: 18/973,664

(22) Filed: Dec. 9, 2024

(65) Prior Publication Data

US 2025/0100243 A1 Mar. 27, 2025

Related U.S. Application Data

(62) Division of application No. 18/105,553, filed on Feb. 3, 2023, now Pat. No. 12,194,706.

(51) Int. Cl.

| | |
|---|---|
| ***B31B 50/00*** | (2017.01) |
| ***B31B 50/02*** | (2017.01) |
| ***B31B 50/14*** | (2017.01) |

(52) U.S. Cl.

CPC .......... *B31B 50/142* (2017.08); *B31B 50/022* (2017.08)

(58) Field of Classification Search

CPC ..... B31B 50/022; B31B 50/142; B31B 50/02; B26D 7/1818; B26D 7/025; B26D 2007/189; B26D 2007/1881

USPC .......................................................... 493/121

See application file for complete search history.

(56) References Cited

U.S. PATENT DOCUMENTS 4,336,518 A * 6/1982 Holce .................. H01H 36/004 335/205

2013/0181027 A1* 7/2013 Kempka, Jr. ........... B23P 11/00 225/103

* cited by examiner

*Primary Examiner* — Jacob A Smith

(74) *Attorney, Agent, or Firm* — Boyle Fredrickson, S.C.

(57) ABSTRACT

A presser assembly is provided for supporting a carton blank. The presser assembly includes a housing having a cavity formed therein. A presser plunger is telescopically received in the housing. The presser plunger is slidable between a first retracted position wherein the presser plunger is at least substantially received with the cavity in the housing and an extended position wherein the presser plunger projects from the open end of the housing. A magnetic biasing structure urges the presser plunger toward the extended position.

7 Claims, 7 Drawing Sheets

PRESSER ASSEMBLY WITH MAGNETIC BIASING

CROSS-REFERENCE TO RELATED APPLICATION

This application is a division of U.S. application Ser. No. 18/105,553, filed Feb. 3, 2023, the entirety of which is incorporated herein.

FIELD OF THE INVENTION

This invention relates generally to blanking operations, and in particular, to a presser assembly with magnetic biasing for supporting a sheet of paper material during a stripping operation to remove scrap portions of material from the sheet.

BACKGROUND AND SUMMARY OF THE INVENTION

In the manufacture of cartons, small sheets of paper material having specific profiles are cut out of larger sheets of paper material. These smaller sheets are known as carton blanks which, in turn, are formed into cartons and/or boxes. The blanks are formed during a process known as a blanking operation in a die cutting machine. More specifically, in a die cutting machine, the blanks are cut, but not removed from a large sheet of paper material. It can be appreciated that various scrap portions of material within the interior of a carton blank may also be cut which correspond to openings, slots or the like that must be removed from the carton blank to allow the carton blank to be subsequently folded into a box or similar structure.

In order to strip these scrap portions from the carton blanks after the cutting of the carton blanks, the sheet of paper material is moved downstream to a stripping station. In the stripping station, the sheet of material is positioned over a frame for support. The frame includes openings which correspond in position to various scrap portions of material to be removed from the interior of the carton blank. An upper tool is used in combination with the lower tool or frame to punch out the various scrap portions of material to be removed from the interior of the carton blank while holding the sheet of paper material in position. More specifically, a plurality of presser assemblies are mounted in a support board and depend therefrom to hold the sheet of paper material against a lower tool or frame during the stripping operation and allow the upper tool to punch out the various scrap portions of material from the interior of the carton black.

As is known, a presser assembly typically includes an engagement member, such as a presser rail, a foot or a plate, which is biased downwardly away from the support board. As the upper tool is lowered, the engagement member engages the sheet of paper material such that the sheet of paper material is secured between the engagement member and the frame. The upper tool then continues to be lowered such that the upper tools punches out the various scrap portions of material from the interior of the carton black. The various scrap portions of material from the interior of the carton black then fall below the frame for disposal and the sheet of paper material to directed downstream to a blanking station wherein carton blanks are removed from the sheet of paper material.

While functional for its intended purpose, it is noted that prior presser assemblies have certain disadvantages. By way of example, prior presser assemblies typically include a housing mounted to a support board and a plunger telescopically received in a cavity of the housing. The plunger is movable between a first retracted position wherein the plunger is at least substantially received with the cavity in the housing and an extended position wherein the plunger projects from the open end of the housing. A single spring biases the plunger towards the extended position, thereby urging the engagement member rail away from the support board.

During a stripping operation, the compression force on the spring often exceeds the spring's elastic limit. As a result, over time, the spring within the presser assembly becomes deformed and wears out, thereby causing the spring, and hence, the presser assembly to fail. Therefore, it is highly desirable to provide a presser assembly which is more durable and will withstand more stripping operations than prior presser assemblies.

Therefore, it is a primary object and feature of this invention to provide a presser assembly which is more durable and can withstand more stripping operations over an extended period of time than prior presser assemblies.

It is a further primary object and feature of this invention to provide a presser assembly having an engagement member which securely holds a carton blank during a stripping operation.

It is still a further object and feature of the present invention to provide a presser assembly which is easy to assemble and easy to mount to standard support member for use in a stripping operation.

In accordance with the present invention, a presser assembly is provided for supporting a carton blank. The presser assembly includes a housing having a cavity formed therein. The housing has a closed end and an open end communicating with the cavity. A presser plunger is telescopically received in the housing. The presser plunger is slidable between a first retracted position wherein the presser plunger is at least substantially received with the cavity in the housing and an extended position wherein the presser plunger projects from the open end of the housing. A magnetic biasing structure urges the presser plunger toward the extended position.

A foot may be operatively connected to the presser plunger and a spring biasing structure may be at least partially received in the housing. The spring biasing structure also urges the presser plunger toward the extended position. The spring biasing structure has a first end abutting the closed end of the housing and a second end operatively engaged with the presser plunger. The magnetic biasing structure includes a magnet positioned within the housing and having a passageway therethough. The passageway is of sufficient dimension to allow the presser plunger to pass therethrough. In addition, the magnetic biasing structure includes a tab formed from a magnetic material and received in a first end of the presser plunger.

The housing includes an inner surface defining the cavity. The presser plunger has an outer surface that forms a slidable interface with the inner surface of the housing. One of the inner surface of the housing and the outer surface of the presser plunger includes a guide projecting therefrom and the other of the inner surface of the housing and the outer surface of the presser plunger includes a guide slot. The guide and guide slot are configured to guide slidable movement of the presser plunger between the retracted and the extended positions.

In accordance with a further aspect of the present invention, a presser assembly for supporting a carton blank is provided. The presser assembly includes a housing having an inner surface defining a cavity, a closed end and an open end communicating with the cavity. A presser plunger is telescopically received in the cavity of the housing and is movable between a retracted position wherein the presser plunger is at least substantially received with the cavity in the housing and an extended position wherein the presser plunger projects from the open end of the housing. A magnetic biasing structure generates a magnet force. The presser plunger travels along a path between the first retracted position and the extended position. The magnetic force acts on the presser plunger during at least a portion of the path to urge the presser plunger towards the extended position.

A foot may be operatively connected to the presser plunger and a spring biasing structure is at least partially received in the housing. The spring biasing structure urges the presser plunger toward the extended position. The spring biasing structure has a first end abutting the closed end of the housing and a second end operatively engaged with the presser plunger. The magnetic biasing structure includes a magnet positioned within the housing and has a passageway therethough. The passageway is of sufficient dimension to allow the presser plunger to pass therethrough. In addition, the magnetic biasing structure includes a tab formed from a magnetic material and received in a first end of the presser plunger.

The housing includes an inner surface defining the cavity. The presser plunger has an outer surface forming a slidable interface with the inner surface of the housing. One of the inner surface of the housing and the outer surface of the presser plunger includes a guide projecting therefrom and the other of the inner surface of the housing and the outer surface of the presser plunger includes a guide slot. The guide and guide slot are configured to guide slidable movement of the presser plunger along the path.

In accordance with a still further aspect of the present invention, a presser assembly supporting a carton blank is provided. The presser assembly includes a housing and a presser plunger telescopically received in the housing. The presser plunger is movable along a path between a retracted position and an extended position. A first biasing structure biases the presser plunger toward the extended position and a second biasing structure acts on the presser plunger during a first portion of the path to urge the presser plunger towards the extended position.

The housing includes an inner surface defining a cavity, a closed end and an open end communicating with the cavity. The presser plunger is slidably receivable in the cavity of the housing. The first biasing structure includes a spring having a first end abutting the closed end of the housing and a second end in operable engagement with the presser plunger. The second biasing structure includes a magnet received with the housing. The magnet has a passageway therethough of sufficient dimension to allow the presser plunger to pass therethrough. A tab formed from a magnetic material is received in a first end of the presser plunger.

The housing includes an inner surface defining a cavity and the presser plunger has an outer surface forming a slidable interface with the inner surface of the housing. One of the inner surface of the housing and the outer surface of the presser plunger includes a guide projecting therefrom and the other of the inner surface of the housing and the outer surface of the presser plunger includes a guide slot. The guide and guide slot are configured to guide slidable movement of the presser plunger between the retracted and the extended positions. A foot may be operatively connected to the presser plunger.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DETAILED DESCRIPTION OF THE DRAWINGS

Figure 1:
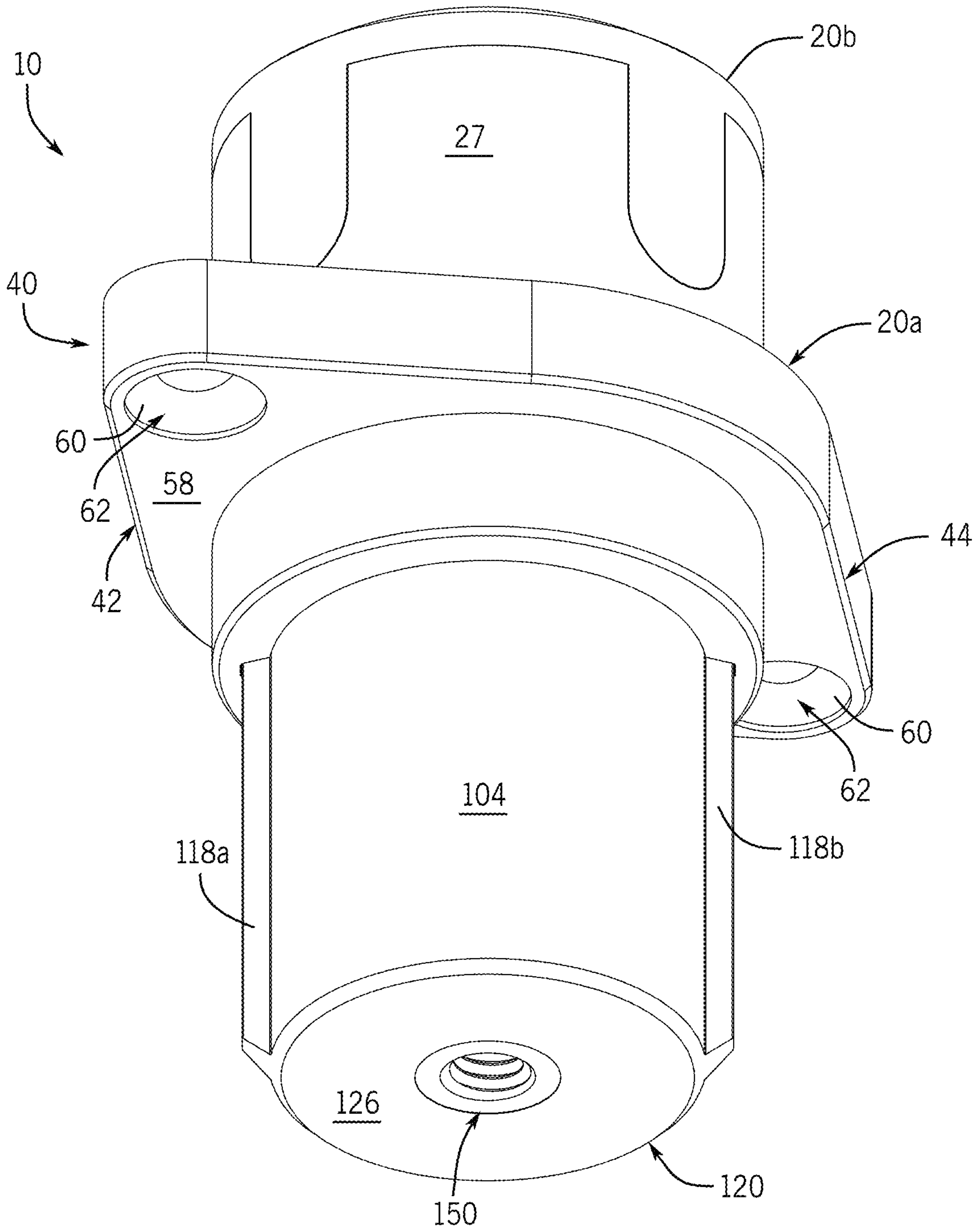
FIG. 1 is an isometric view of a presser assembly in accordance with the present invention shown in its extended position.
Figure 4:
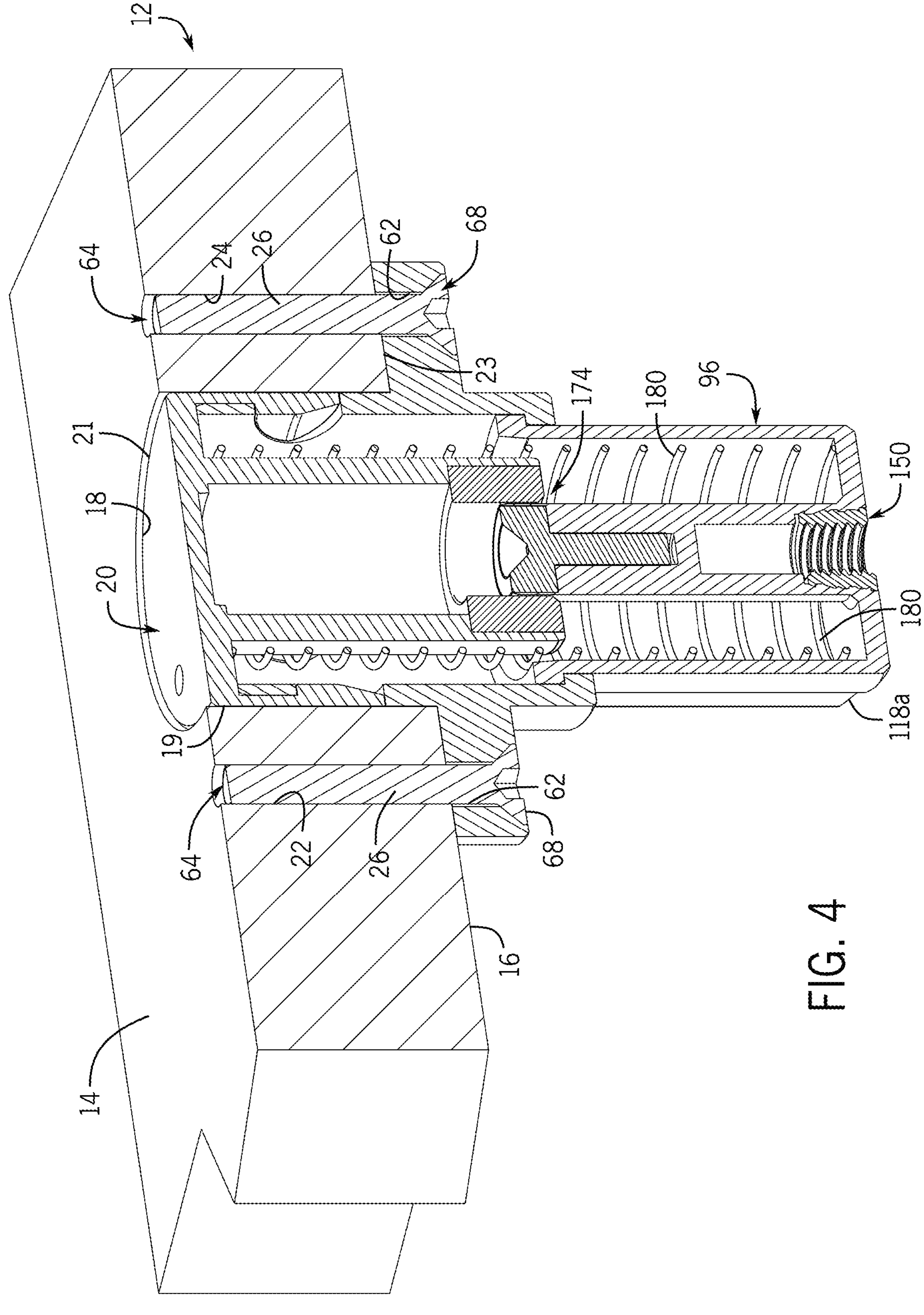
FIG. 4 is a cross-sectional view of the presser assembly of the present invention, similar to FIG. 2, wherein the presser assembly is mounted within a support member.
Figure 5:
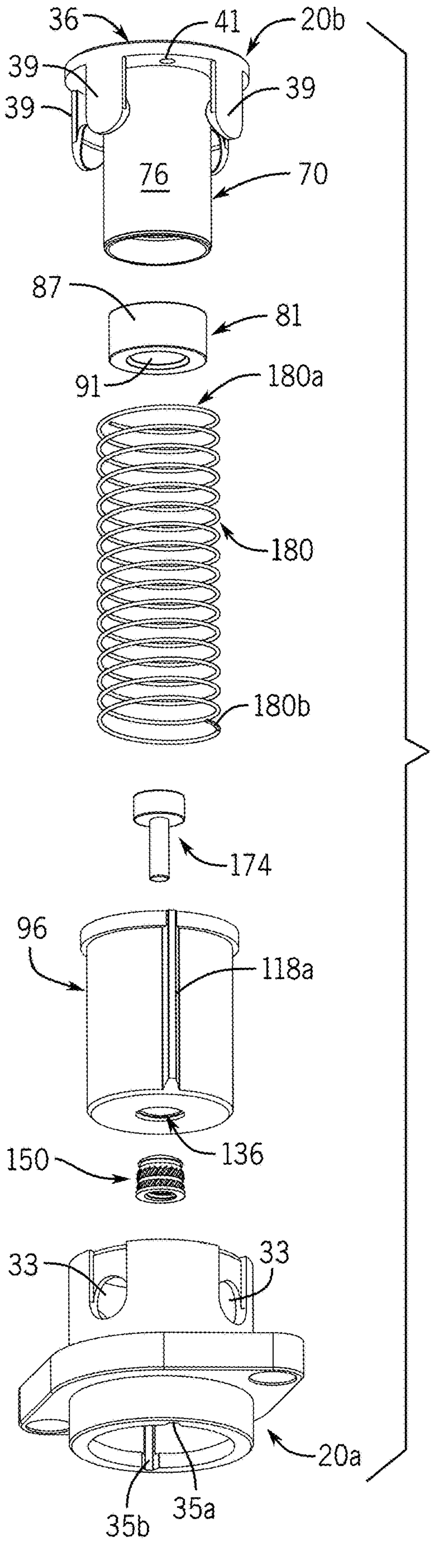
FIG. 5 is an exploded isometric view of the presser assembly of the present invention.
Figure 6:
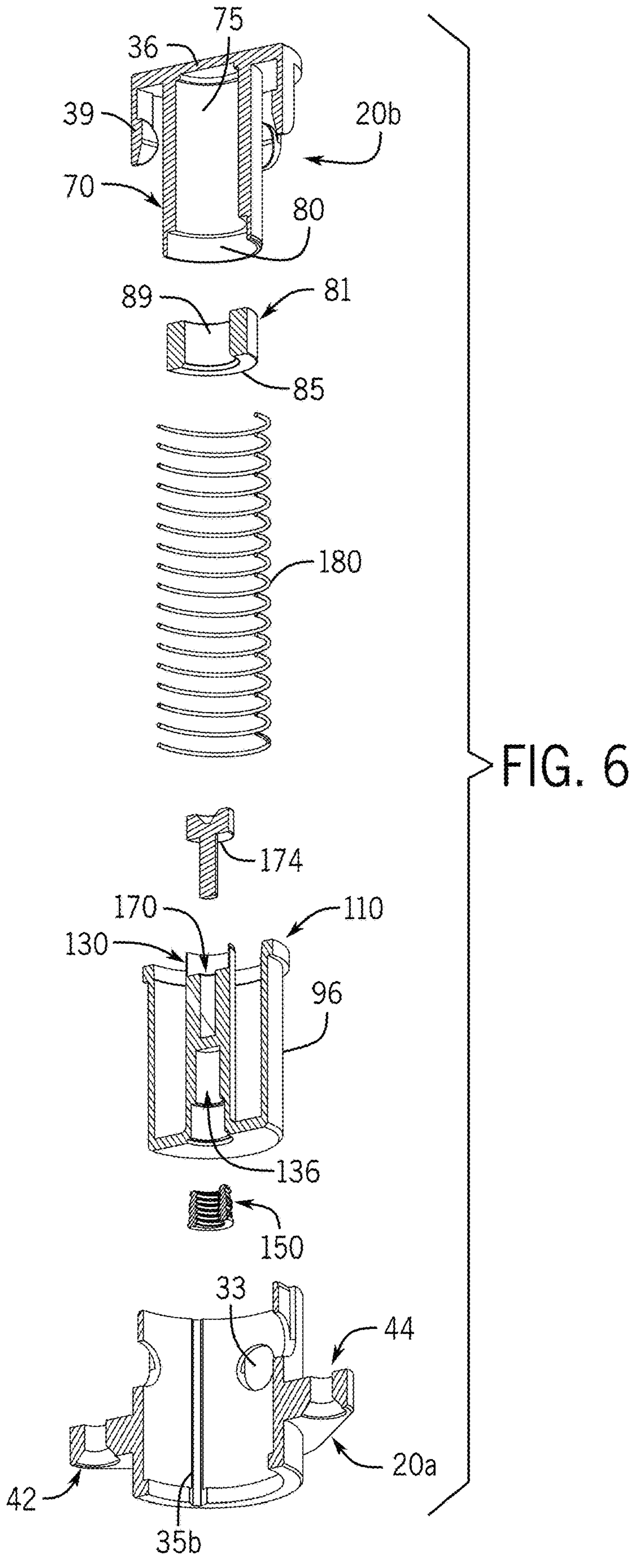
FIG. 6 is an exploded isometric view, similar to FIG. 5, showing the presser assembly of the present invention in cross-section.
Figure 7:
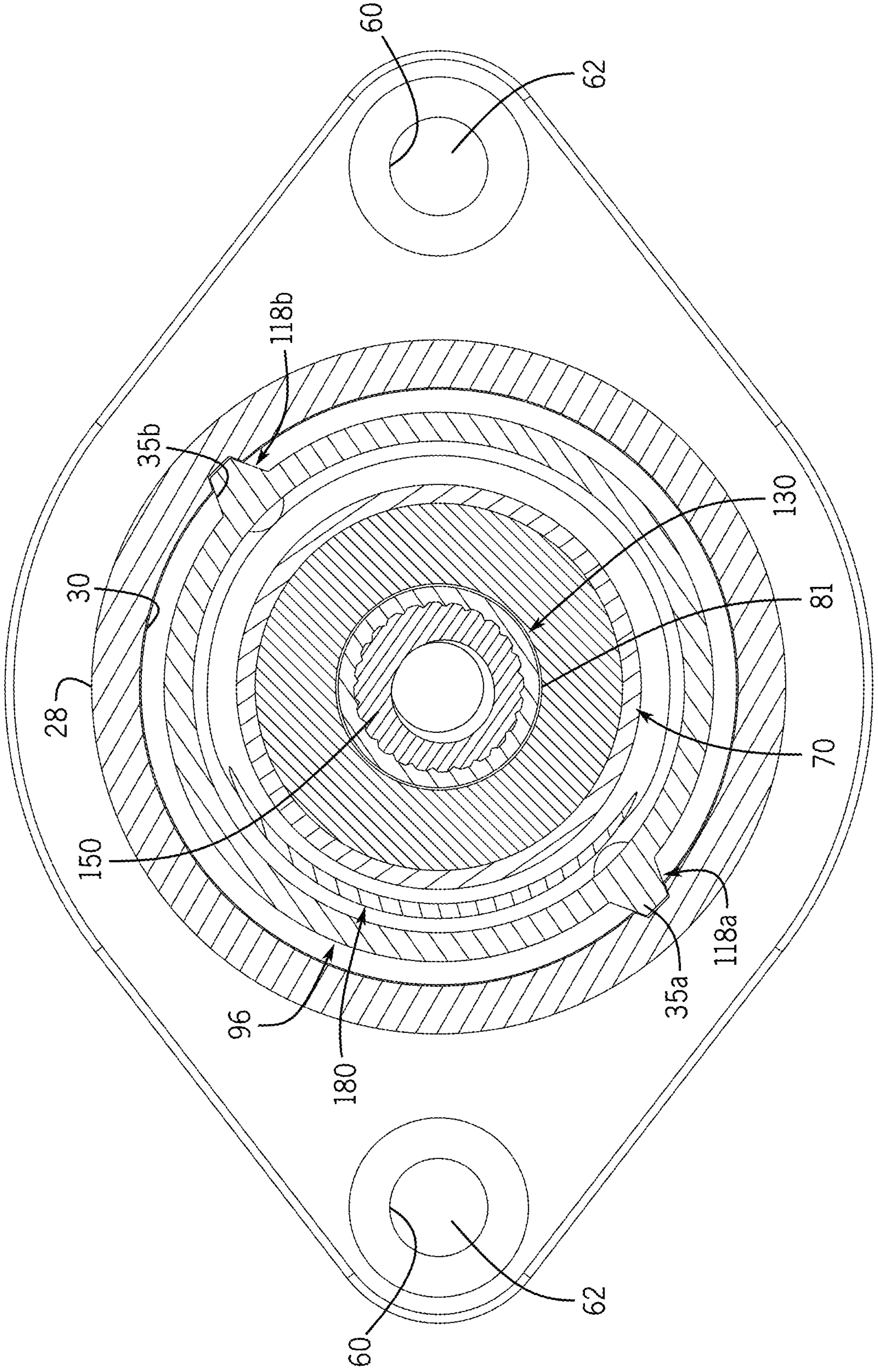
FIG. 7 is a cross-sectional view showing the presser assembly of the present invention taken along line 7-7 of FIG. 3.

Referring to FIG. 1, a presser assembly in accordance with the present invention is generally designated by the reference number 10. As best seen in FIG. 4, presser assembly 10 is secured to a flat, plate-like support member or board 12 typically composed of a wood material, such as plywood or the like. The dimensions of support member 12 can vary depending upon the dimensions of the sheet of paper material with which it is used, as is well known to those skilled in the art. As is conventional, support member 12 moves vertically during a stripping operation.

Support member 12 is defined by a planer upper surface 14 and a planer lower surface 16 lying in corresponding, substantially horizontal planes. Support member 12 includes bore 18 extending between upper and lower surfaces 14 and 16, respectively, along an axis perpendicular thereto. Bore 18 is defined by a generally cylindrical inner surface 19 intersecting upper and lower surfaces 14 and 16, respectively, at corresponding edges 21 and 23, respectively. It is contemplated for edges 21 and 23 to have generally circular configurations. Bore 18 has a diameter of sufficient dimension to accommodate the receipt of housing 20 of presser assembly 10, as hereinafter described. Threaded bores 22 and 24 also extend through support member 12 between upper and lower surfaces 14 and 16, respectively. Threaded bores 22 and 24 are positioned on opposite sides of bore 18 and are intended to receive shafts 26 of corresponding bolts 64, in a mating relationship in order to interconnect housing 20 to support member 12, for reasons hereinafter described.

Referring to FIGS. 1-5, presser assembly 10 includes housing 20 which is mountable to support member 12. Housing 20 may be constructed as a single, integral unit or as two distinct elements **20*a* and 20*b* interconnected to form a single unit. By way of example, housing 20***a* includes a generally cylindrical wall 28 defining a generally cylindrical inner surface 30, a generally cylindrical outer surface 27, a first end 29 and a second end 32. Inner surface 30 of cylindrical wall 28 of housing element 20*a* defines cavity 66 within housing 20 and includes first and second circumferentially spaced, v-shaped grooves 35*a* and 35*b*, respectively, extending axially between first and second ends 29 and 32, respectively, of cylindrical wall 28, for reasons hereinafter described. The outer diameter of cylindrical wall 28 approximates the diameter of bore 18 in support member 12 such that bore 18 accommodates the receipt of housing 20 of presser assembly 10 therein, FIG. 4. A plurality of circumferentially spaced apertures 33 extend through cylindrical wall 28, for reasons hereinafter described.

Shoulder portion 40 extends outwardly from outer surface 27 of housing element 20*a* and includes first arm 42 and second arm 44 interconnected by neck portion 46 extending about outer surface 34. Each of the first and second arms 42 and 44, respectively, are defined by upper surfaces 56 and lower surfaces 58 with are generally parallel to each other. Upper and lower surfaces 56 and 58, respectively, of first and second arms 42 and 44, respectively, are interconnected by circular walls 60 which define bolt passages 62 through first and second arms 42 and 44, respectively. In order to connect housing element 20*a*, and hence housing 20, to support member 12, bolts 64 extend through corresponding bolt passages 62 in first and second arms 42 and 44, respectively, of the housing 34 and into corresponding threaded bores 22 and 24 in support member 12. Bolts 64 include heads 68, FIG. 4, having diameters greater than that of bolt passages 62 in order to prevent housing 20 from sliding axially off bolts 64 when shafts 26 of bolts 64 are threaded into threaded bores 22 and 24 of support member 12.

Housing element 20*b* includes end wall 36 having a plurality of resilient mounting tangs 39, corresponding in the number of apertures 33 extending through cylindrical wall 28 of housing element 20*a*, depending from the outer periphery thereof. Aperture 41 may extend through end wall 36 to allow air to pass therethough during compression of presser assembly 10, as hereinafter described. Tangs 39 are adapted for engagement with corresponding apertures 33 to interconnect housing elements 20*a* and 20*b*. With housing elements 20*a* and 20*b* interconnected, end wall 36 of housing element 20*b* closes second end 32 of cylindrical wall 28. End wall 36 is defined by inner surface 36*a*, intersecting inner surface 30 of cylindrical wall 28 and directed toward cavity 66 within housing 20 and outer surface 36*b*, directed away from cavity 66 within housing 20 and lying in a plane generally perpendicular to outer surface 27.

Inner surface 36*a* of end wall 36 of housing element 20*b* includes a generally circular recess 86 formed therein. Recess 86 is centrally spaced from inner surface 30 of cylindrical wall 28 and is intended to have a diameter slightly greater than the diameter of second terminal end 134 of cylindrical member 130 of presser plunger 96, for reasons hereinafter described. Recess 86 is defined by recessed surface 90 which lies in a plane generally parallel to inner surface 36*a* of end wall 36 of housing element 20*b* and is spaced from inner surface 36*a* of end wall 36 of housing element 20*b* by generally cylindrical surface 92.

Spring alignment member 70 projects from inner surface 36*a* of end wall 36 and extends about the outer periphery of recess 86. In the depicted embodiment, spring alignment member 70 has a generally tubular configuration and is defined by a generally cylindrical wall 72 projecting inner surface 36*a* of end wall 36 and is concentric with generally cylindrical wall 28. Wall 72 includes a generally cylindrical inner surface 74 defining cavity 75, a generally cylindrical outer surface 76 and a terminal end 78. Lower portion 74*a* of inner surface 74 of wall 72 adjacent terminal end 78 is recessed so as to define a magnet receipt cavity 80, for reasons hereinafter described. Magnet receipt cavity 80 is further defined by shoulder 82 which is spaced from and lies in a plane parallel to terminal end 78. Outer surface 76 of wall 72 is spaced from inner surface 30 of cylindrical wall 28 of housing element 20*a* to further define cavity 66 therebetween for receiving coil spring 86 therein, as hereinafter described.

Figure 2:
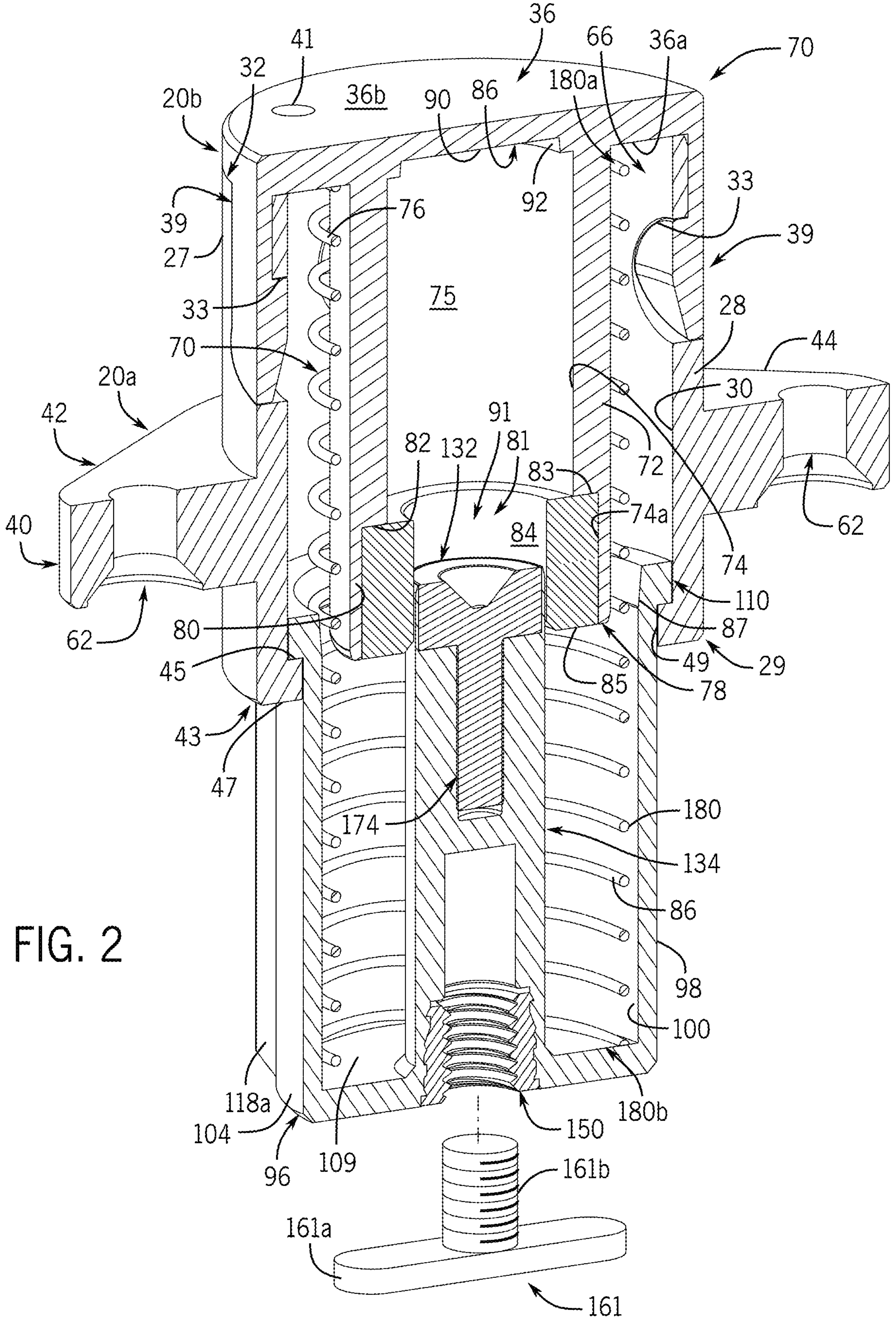
FIG. 2 is a cross-sectional view of the presser assembly of the present invention in an extended position taken along line 2-2 of FIG. 1.

As best seen in FIG. 2, magnet receipt cavity 80 is configured to receive a generally ring-shaped magnet 81. In the preferred embodiment, magnet 81 is a rare earth magnet fabricated from neodymium iron boron (NdFeB). Magnet 81 includes upper and lower surfaces 83 and 85, respectively, interconnected by radially outer surface 87 which is engageable with lower portion 74*a* of inner surface 74 of wall 72 and radially inner surface 89 which defines passageway 91 though magnet 81 which communicates with cavity 75. Passageway 91 has a diameter sufficient to allow presser plunger 96 to pass therethough, for reasons hereinafter described. It is contemplated for magnet 81 to have an outer diameter substantially the same as the diameter of magnet receipt cavity 80 so as to allow magnet 81 to be press fit into magnet receipt cavity 80 and retained therein by the frictional force between outer surface 87 and lower portion 74*a* of inner surface 74 of wall 72. Although, magnet 81 may be retained in magnet receipt cavity 80 by other methods, such an adhesive or the like, without deviating from the scope of the present invention. With magnet 81 retained within magnet receipt cavity 80, upper surface 83 of magnet 81 abuts shoulder 82 and lower surface 85 of magnet 81 is generally co-planar with terminal end 78 of spring alignment member 70.

Flange 43 projects radially inward from inner surface 30 of cylindrical wall 28 of housing 20*a* adjacent first end 29 thereof. Flange 43 includes a generally flat first surface 45 extending radially inward from and intersecting inner surface 30 of cylindrical wall 28 and a second surface 47 extending radially inward from and intersecting outer surface 27 of cylindrical wall 28. Flange 43 includes a radially inner edge 49 which forms a slidable interface with outer surface 84 of cylindrical outer wall 98 of presser plunger 96, as hereinafter described. It can be understood that first surface 45 of flange 43 acts a stop to limit travel and maintain the telescopic arrangement of presser plunger 96 within housing 20.

Presser assembly 10 further includes presser plunger 96 telescopically received within cavity 66 of housing 20. Presser plunger 96 is defined by a generally cylindrical outer wall 98 defining a generally cylindrical inner surface 100, a generally cylindrical outer surface 104, and first and second opposite ends 106 and 108, respectively. Inner surface 100 communicates with spring receipt cavity 109, as hereinafter described. As noted above, cylindrical outer wall 98 has a diameter such that outer surface 104 thereof forms a slidable interface with inner edge 49 of flange 43 of housing 20. Circumferentially spaced ribs 118*a* and 118*b* extend axially along outer surface 104 of outer wall 98 between first and second ends 106 and 108 thereof and is slidably received within corresponding grooves 35*a* and 35*b*, respectively, extending axially along inner surface 30 of cylindrical wall 28 of housing 20 to guide movement of presser plunger 96 between its extended, FIGS. 1-2 and 4, and retracted, FIG. 3, positions.

Presser plunger 96 further includes flange 110 projecting radially outward from outer surface 104 of cylindrical outer wall 98 adjacent first end 106 thereof. Flange 110 includes a generally flat first surface 112 extending radially outward from and intersecting inner surface 100 of cylindrical outer wall 98 and a second surface 114 extending radially outward from and intersecting outer surface 104 of cylindrical outer wall 98. Flange 110 includes a radially outer edge 116 which forms a slidable interface with inner surface 30 of cylindrical wall 28 of housing 20. As noted above, it can be understood that first surface 45 of flange 43 acts as a stop to limit travel and maintain the telescopic arrangement of presser plunger 96 within housing 20.

End wall 120 extends radially inward from second end 108 of outer wall 98 and includes a radially inner edge 122 defining opening 124 in presser plunger. End wall 120 is defined by a generally flat first surface 126 extending from and lying in a plane generally perpendicular to outer surface 104 of outer wall 98, and a second surface 128 extending from and intersecting inner surface 100 of outer wall 98.

Cylindrical member 130 projects from second surface 128 of end wall 120 and includes outer surface 132, a recess 136 formed in lower first end 138, and a second terminal end 134. In the depicted embodiment, cylindrical member 130 is centrally disposed on second surface 128. Recess 136 communicates with opening 124 in end wall 120 and is defined by a generally cylindrical surface 140 extending from radially inner edge 122 of end wall 120 and terminating at closed end 142. First portion 140*a* of cylindrical surface 140 adjacent radially inner edge 122 of end wall 120 includes threads 144, for reasons hereinafter described.

Insert 150 is receivable in recess 136 of cylindrical member 130. More specifically, insert 150 includes a generally cylindrical wall 152 defining a generally cylindrical inner threaded surface 154 defining a passageway 156 therethrough, a generally cylindrical outer threaded surface 158, and first and second ends 160 and 162, respectively. It is intended to interconnect insert 150 to presser plunger 96 by threading outer threaded surface 158 into first portion 140*a* of cylindrical surface 140 so as to retain insert 150 within recess 136 of cylindrical member 130. Insert 150 further includes flange 164 projecting radially outward from outer threaded surface 158 of cylindrical wall 152 adjacent second end 162 thereof. Flange 164 includes a lower surface 166 which is substantially flush with first surface 126 of end wall 120 with insert 150 received within recess 136 of cylindrical member 130. It is contemplated interconnect a resilient foot or the like to insert 150, and hence, presser assembly 10. By way of example, foot 161 may include body portion 161*a* having neck 161*b* projecting therefrom, FIG. 2. The neck of the foot may be threaded into inner threaded surface 154 of insert 150 to interconnect the foot to presser plunger 96.

Figure 3:
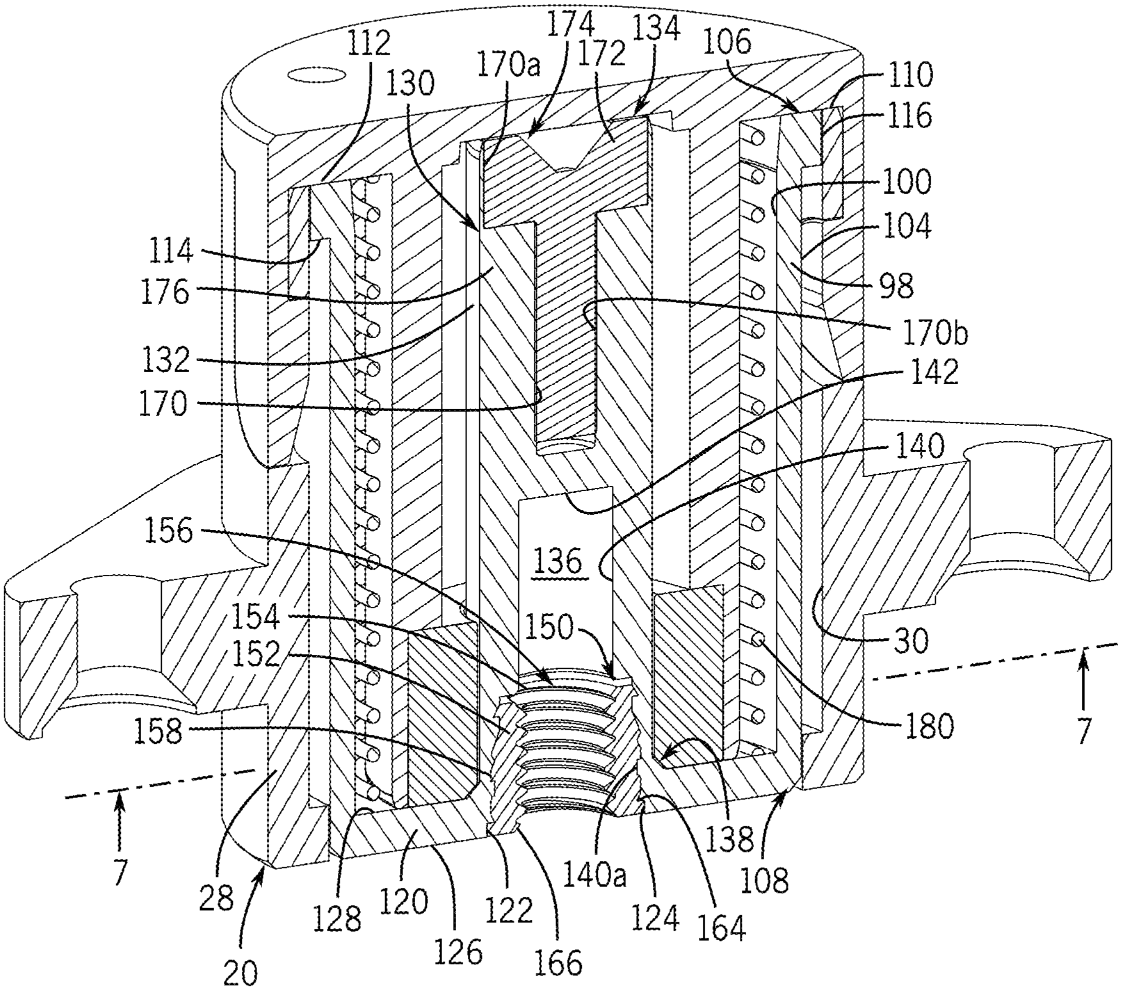
FIG. 3 is a cross-sectional view of the presser assembly of the present invention, similar to FIG. 2, showing the presser assembly in a retracted position.

Second terminal end 134 of cylindrical member 130 includes a tab receipt recess 170 formed therein. Tab receipt recess 170 is defined by a generally disc-shaped, enlarged portion 170*a* communicating with second terminal end 134 of cylindrical member 130 is adapted for receiving head 172 of tab 174 therein. Tab receipt recess 170 further includes a reduced diameter portion 170*b* having a first end communicating with enlarged portion 170*a* of tab receipt recess 170 and a second, closed end. Reduced diameter portion 170*b* of tab receipt recess 170 is adapted for receiving neck 176 of tab 174. As best seen in FIG. 3, tab receipt recess 170 has a generally T-shaped cross-section.

Tab 174 also has a generally T-shaped cross-section and is configured for receipt within tab receipt recess 170. More specifically, tab 174 is defined by a generally disc-shaped head 172 configured for receipt within enlarged portion 170*a* of tab receipt recess 170. Neck 176 depends head 172 and is adapted for receipt within reduced diameter portion 170*b* of tab receipt recess 170. For reasons hereinafter described, it is contemplated to fabricate all or a portion of tab 174 from a magnetic material.

Presser assembly 10 further includes coil spring 180 for biasing presser plunger 96 to an extended position, FIGS. 1-2 and 4. More specifically, first end 180*a* of coil spring 180 is positioned within spring receipt cavity 66 within housing 20 and about outer surface 76 of cylindrical wall 72 of spring alignment member 70 thereby axially centering coil spring 180 in housing 20. Second end 180*b* of coil spring 180 is positioned in presser plunger within cavity 109 between inner surface 100 of outer wall 98 and outer surface 132 of cylindrical member 130 such that second end 180*b* of second coil spring 180 engages second surface 128 of end wall 120 of presser plunger 96 and the portion of coil spring 180 adjacent second end 180*b* of coil spring 180 extends about outer surface 132 of cylindrical member 130 of presser plunger 96. As described, coil spring 180 urges presser plunger 96 to a telescopically extended position, projecting from housing 20. As noted above, first surface 45 of flange 43 acts a stop to limit travel and maintain the telescopic arrangement of presser plunger 96 within housing 20.

In operation, housing 20 of presser assembly 10 is interconnected to support member 12. Support member 12 is positioned over a stripping frame (not shown) supporting a sheet of paper material, such as a carton blank, and presser plunger 96 is biased by magnet 81 and by coil spring 180, respectively, to its extended position, FIGS. 1-2 and 4. More specifically, magnet 81 provides a repelling force acting on tab 174, thereby urging presser plunger 96 to its extended position. As support member 12 is lowered in the blanking station, the foot attached to presser assembly 10 engages the upper surface of sheet of paper material 190 and holds it against the stripping frame located below the sheet. As support member 12 continues downwardly, presser plunger 96 is urged against the biasing force of coil spring 180 and magnet 81 into cavity 66 within housing 20 such that first surface 112 of flange 110 travels towards second surface 38 of end cap 36. Simultaneously, cylindrical member 130 passes through passageway 91 of magnet 81 and into cavity 75 defined by inner surface 74 of spring alignment member 70. As cylindrical member 130 passes through passageway 91 of magnet 81, tab 174 passes the pole of magnet 81 generating the repelling force thereon, thereby eliminating the biasing force of magnet 81 on presser plunger 96. As such, support member 12 may continue its downwardly movement until presser plunger 96 is fully received within housing 20; second terminal end 134 of cylindrical member 130 is received in recess 86 in inner surface 36*a* of end wall 36 of housing element 20*b*; and the pushers attached to support member 12 knock out any scrap material from a sheet of paper material.

As support member 12 is moved back upwardly to its initial starting position, coil spring 180 urges presser plunger 96 towards its extended position. It can be understood that as tab 174 approaches and passes through passageway 91 in magnet 81, the repelling force generated by magnet 81, once again, acts on tab 174, thereby urging presser plunger 96, in conjunction with coil spring 180, to its extended position, wherein the process may be repeated.

By utilizing the repelling force generated by magnet 81 on tab 174 to urge presser plunger 96 to its extended position, it can be understood that the biasing force of coil spring 180 can be minimized. The minimization of the biasing force of coil spring 180 needed to urge presser plunger 96 to its extended position allows for a smaller and more resilient coil spring to used within presser assembly 10. Smaller coil springs have a longer useful life and are less likely to fail, thereby allowing presser assembly 10 to perform for a long period of time without maintenance, a significant advantage over the art.

It can be appreciated that various modes of carrying out the invention are contemplated as being within the scope of the following claims particularly pointing out and distinctly claiming the subject matter, which is regarded as the invention.

I claim:

1. A presser assembly supporting a carton blank, comprising:

a housing;

a presser plunger telescopically received in the housing, the presser plunger movable along a path between a retracted position and an extended position;

a first biasing structure biasing the presser plunger toward the extended position; and a second biasing structure acting on the presser plunger during a first portion of the path to urge the presser plunger towards the extended position.

2. The presser assembly of claim 1 wherein the housing including an inner surface defining a cavity, a closed end and an open end communicating with the cavity, the presser plunger is slidably receivable in the cavity of the housing.

3. The presser assembly of claim 2 wherein the first biasing structure includes a spring having a first end abutting the closed end of the housing and a second end in operable engagement with the presser plunger.

4. The presser assembly of claim 1 wherein the second biasing structure includes a magnet received with the housing, the magnet having a passageway therethough, the passageway of sufficient dimension to allow the presser plunger to pass therethrough.

5. The presser assembly of claim 4 further comprising a tab formed from a magnetic material and received in a first end of the presser plunger.

6. The presser assembly of claim 1 wherein:

the housing includes an inner surface defining a cavity;

the presser plunger having an outer surface forming a slidable interface with the inner surface of the housing; and one of the inner surface of the housing and the outer surface of the presser plunger including a guide projecting therefrom and the other of the inner surface of the housing and the outer surface of the presser plunger including a guide slot, the guide and guide slot configured to guide slidable movement of the presser plunger between the retracted and the extended positions.

7. The spot presser assembly of claim 1 further comprising a foot operatively connected to the presser plunger.

* * * * *